United States Patent
Patnaik et al.

(10) Patent No.: US 8,683,170 B1
(45) Date of Patent: Mar. 25, 2014

(54) CONSISTENT DISTRIBUTED STORAGE COMMUNICATION PROTOCOL SEMANTICS IN A CLUSTERED STORAGE SYSTEM

(75) Inventors: Pranab Patnaik, Cary, NC (US); Kai Tan, Cary, NC (US); Vivek Venkatesan, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 206 days.

(21) Appl. No.: 13/244,159

(22) Filed: Sep. 23, 2011

(51) Int. Cl.
*G06F 12/06* (2006.01)

(52) U.S. Cl.
USPC ............ 711/170; 711/E12.019; 711/E12.087

(58) Field of Classification Search
USPC ................... 711/114, 170, E12.087, E12.019
See application file for complete search history.

(56) References Cited

U.S. PATENT DOCUMENTS

| | | | |
|---|---|---|---|
| 5,748,958 | A | 5/1998 | Badovinatz et al. |
| 6,452,689 | B1 | 9/2002 | Srinivasan |
| 6,535,119 | B1 | 3/2003 | Haulk et al. |
| 6,567,937 | B1 | 5/2003 | Flores et al. |
| 7,451,152 | B2 | 11/2008 | Kraft et al. |
| 2002/0006114 | A1 | 1/2002 | Bjelland et al. |
| 2003/0110221 | A1 | 6/2003 | Berkowitz et al. |
| 2004/0064633 | A1* | 4/2004 | Oota ............................ 711/100 |
| 2004/0128587 | A1 | 7/2004 | Kenchammana-Hosekote et al. |
| 2005/0055501 | A1* | 3/2005 | Guha et al. ..................... 711/112 |
| 2005/0120160 | A1* | 6/2005 | Plouffe et al. ..................... 711/1 |
| 2005/0192932 | A1 | 9/2005 | Kazar et al. |
| 2005/0283644 | A1 | 12/2005 | Lorch et al. |
| 2006/0095705 | A1 | 5/2006 | Wichelman et al. |
| 2006/0100981 | A1 | 5/2006 | Jones et al. |
| 2006/0136781 | A1 | 6/2006 | Lamport |
| 2006/0168011 | A1 | 7/2006 | Lamport |
| 2007/0214355 | A1 | 9/2007 | Lamport |
| 2007/0234115 | A1 | 10/2007 | Saika |
| 2007/0239944 | A1* | 10/2007 | Rupanagunta et al. ....... 711/147 |
| 2008/0243933 | A1 | 10/2008 | Holtzman et al. |
| 2009/0040926 | A1 | 2/2009 | Li et al. |
| 2009/0043887 | A1 | 2/2009 | Coekaerts |
| 2009/0119666 | A1* | 5/2009 | McKean et al. ............... 718/100 |
| 2009/0172142 | A1 | 7/2009 | Hanai et al. |
| 2009/0287825 | A1 | 11/2009 | Walker et al. |
| 2010/0011245 | A1 | 1/2010 | Talaugon et al. |
| 2010/0017495 | A1 | 1/2010 | Lamport |
| 2010/0185847 | A1 | 7/2010 | Shasha et al. |
| 2010/0228915 | A1* | 9/2010 | Ogihara et al. ............... 711/114 |
| 2011/0072228 | A1* | 3/2011 | Nagata et al. .................. 711/162 |
| 2012/0278568 | A1* | 11/2012 | Broido et al. .................. 711/162 |
| 2013/0080559 | A1 | 3/2013 | Rao et al. |

OTHER PUBLICATIONS

Co-pending U.S. Appl. No. 13/244,159, filed Sep. 23, 2011.

(Continued)

*Primary Examiner* — Hal Schnee
(74) *Attorney, Agent, or Firm* — Perkins Coie LLP

(57) ABSTRACT

Consistent distributed storage communication protocol semantics, such as SCSI target semantics, in a SAN-attached clustered storage system are disclosed. The system includes a mechanism for presenting a single distributed logical unit, comprising one or more logical sub-units, as a single logical unit of storage to a host system by associating each of the logical sub-units that make up the single distributed logical unit with a single host visible identifier that corresponds to the single distributed logical unit. The system further includes a mechanism to maintain consistent context information for each of the logical sub-units such that the logical sub-units are not visible to a host system as separate entities from the single distributed logical unit.

19 Claims, 6 Drawing Sheets

(56) References Cited

OTHER PUBLICATIONS

Co-pending U.S. Appl. No. 13/359,203 of Rao, S.A., et al., filed Jan. 26, 2012.
Glider, J.S., et al., "The Software Architecture of a SAN Storage Control System," IBM Systems Journal, vol. 42, No. 2, 2003, pp. 232-249.
International Search Report PCT/US2012/054927 dated Feb. 27, 2012, pp. 1-4.
Written Opinion PCT/US2012/054927 dated Feb. 27, 2012, pp. 1-5.
Non-Final Office Action Mailed Jun. 11, 2013 in U.S. Appl. No. 13/244,057, 30 pages.
Non-Final Office Action Mailed May 6, 2013 in U.S. Appl. No. 13/244,119 22 pages.
Co-pending U.S. Appl. No. 61/538,786, filed Sep. 23, 2011.
Co-pending U.S. Appl. No. 13/244,119, filed Sep. 23, 2011.
Co-pending U.S. Appl. No. 13/244,057, filed Sep. 23, 2011.
Final Office Action Mailed Dec. 10, 2013 in Co-Pending U.S. Appl. No. 13/244,119 of Brown, G., et al., filed Sep. 23, 2011.
Final Office Action Mailed Dec. 24, 2013 in Co-Pending U.S. Appl. No. 13/244,057 of Brown, G., et al., filed Sep. 23, 2011.

* cited by examiner

CONSISTENT DISTRIBUTED STORAGE COMMUNICATION PROTOCOL SEMANTICS IN A CLUSTERED STORAGE SYSTEM

FIELD OF THE INVENTION

At least one embodiment of the present invention pertains to network storage systems, and more particularly, to maintaining consistency between distributed objects in a Storage Area Network (SAN)-attached clustered storage system.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Storage servers in a SAN environment organize the storage into one or more logical units that can be addressed by the host and be used as containers to store data. Each logical unit can be divided into a number of fixed size logical blocks, and the host can store/retrieve data at the granularity of a logical block. Still other storage servers are capable of servicing both file-level requests and block-level requests, as is the case with certain storage servers made by NetApp®, Inc. of Sunnyvale, Calif., employing the Data ONTAP® storage operating system.

A network storage system can have an individual storage server that provides one or more clients with access to data stored in a mass storage subsystem. Recently, however, with storage capacity demands increasing rapidly in almost every business sector, there has been a trend towards the use of clustered network storage systems, to improve scalability. In addition, as more and more business critical applications are being deployed on virtualized, shared infrastructure, there has been a trend towards using clustered network storage systems to improve reliability. In a clustered storage system, two or more storage server nodes are connected in a distributed architecture. Each storage server node is in fact a storage server, although it has a distributed architecture. Two or more such storage server nodes are typically connected to form a storage cluster, where each of the nodes in the cluster can communicate with the other nodes in the cluster.

A clustered architecture allows convenient scaling through the addition of more nodes, all capable of communicating with each other. Further, a storage cluster may present a single system image of stored data to clients and administrators, such that the actual location of data can be made transparent to clients and administrators. However, as the number of nodes in a cluster increases, maintaining a consistent single system image across the nodes of the cluster becomes a challenge as management and control operations are performed on the cluster resources.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
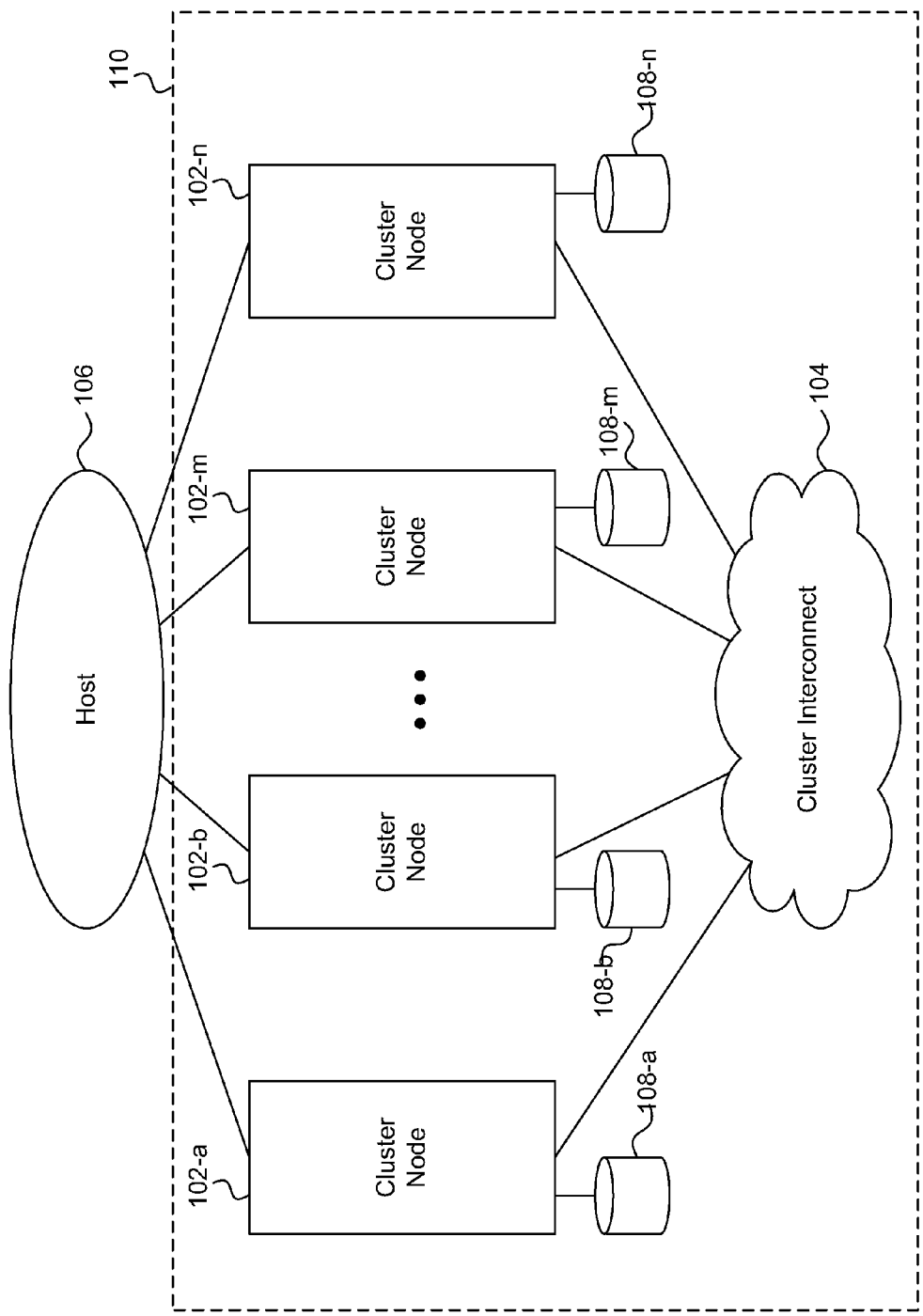
FIG. 1 shows an example of a clustered storage system in a storage area network (SAN) environment.

FIG. 1 shows an example of a clustered storage system in a storage area network (SAN) environment, which includes two or more cluster nodes 102a-102n and a cluster interconnect 104. At least one host 106 is connected with the cluster nodes 102. However, to facilitate description a single host is depicted in FIG. 1.

As shown in FIG. 1, each cluster node 102 of the clustered storage system is coupled with a corresponding mass storage device 108a-108n. Typically, each cluster node 102 is coupled with two or more mass storage devices. However, to facilitate description a single mass storage device 108a-108n coupled with each corresponding cluster node 102a-102n is depicted in FIG. 1. The mass storage devices 108 can be of any one or more of various types of storage, such as magnetic disks, flash memory, solid-state drives (SSDs), tape storage, etc., and can be implemented as a single device, multiple devices, (e.g., a RAID group), or any other configuration of devices.

The SAN-attached clustered storage system can make some or all of the storage space on the mass storage devices 108 available to the host 106. For example, the host 106 can access a cluster node 102 of the SAN-attached clustered storage system using well known protocols, such as Internet Small Computer System Interface (iSCSI), Fibre Channel Protocol (FCP), or Fibre Channel over Ethernet (FCoE). The cluster node 102 can present or export data stored on the mass storage devices 108 as logical units (LUNs), for example, to the host 106. A cluster node 102 in the SAN-attached clustered storage system can communicate with each other cluster node 102 over the cluster interconnect 104, which can be implement, for example, as a Gigabit Ethernet switch. In one embodiment, the cluster nodes 102 are configured as high availability pairs. However, it is understood that other high availability configurations are possible.

Figure 2:
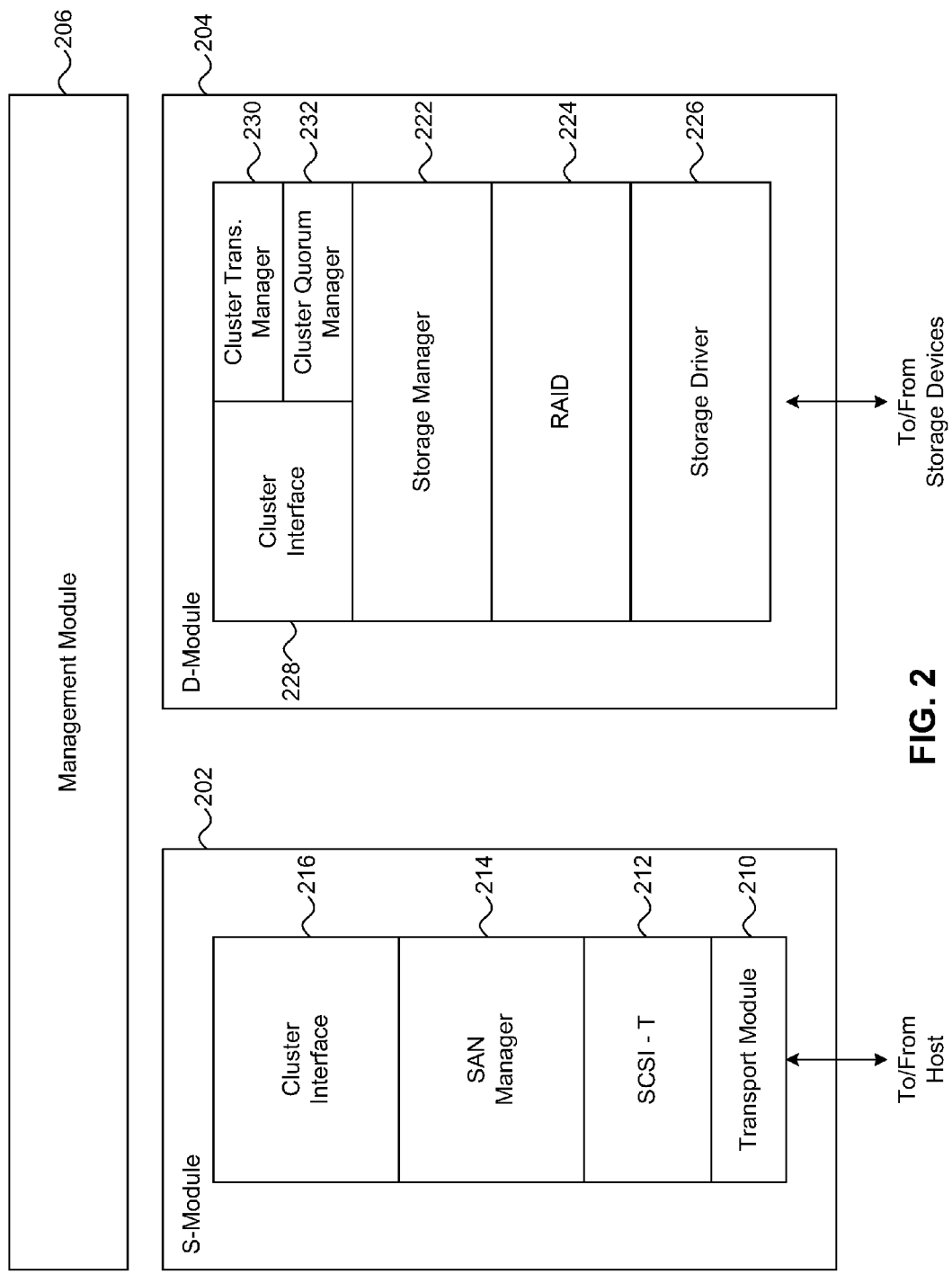
FIG. 2 illustrates an example of a storage operating system that can be used in a clustered storage system in a SAN environment such as shown in FIG. 1.

FIG. 2 illustrates an example of a storage operating system, which can be used to implement a node of a SAN-attached clustered storage system such as shown in FIG. 1. In the illustrated embodiment the storage operating system implements a cluster node 102 as an S-module 202, a D-module 204, and a management module 206. The S-module 202, D-Module 204, and management module 206 may be implemented on the same or separate storage controllers or computers. The S-module 202 includes multiple functional components that provide a data path for a host to access information stored on the node using block access protocols, such as iSCSI, FCP, or FCoE. The functional components in combination with underlying processing hardware form the S-module 202. While described as function components of the S-module herein, the functional components can be logically located essentially any place in the storage operating system.

The functional components in the S-module 202 include a SCSI target instance (SCSI-T) 212 that includes a SCSI engine that performs the core SCSI protocol processing. The SCSI target instance 212 also includes functionality that allows the SCSI engine to work with other subsystems and components. The SCSI target instance 212 interacts with peer SCSI target instances on the other cluster nodes. As described in more detail below with reference to FIG. 3, each SCSI target instance 212 implements one or more target sub-devices, which collectively form a single distributed target device such that a host connected to the SAN sees a single target device. The functional components of the S-module 202 also include a SAN manager 214 which handles management operations in the SAN. For example, the SAN manager 214 coordinates cluster wide configuration updates. Further, the functional components of the S-module 202 include a cluster interface module 216 which implements intra-cluster communication with the D-module 204 and with other S-modules. Finally, the functional components of the S-module 202 include a transport module 210 that manages the FCP, iSCSI, or FCoE ports that connect to/from the host.

In addition, the storage operating system includes a set of data access components organized to provide data paths for accessing information stored on the storage devices of a node; these components in combination with underlying processing hardware form a D-module. To that end, the data access components include, for example, a storage manager module 222, a RAID system module 224, and a storage driver system module 226.

The storage manager 222 primarily manages the layout of data on the mass storage devices 108 and serves host-initiated read and write requests. The RAID system 224 manages the storage and retrieval of information to and from the storage devices 108 in accordance with a RAID redundancy protocol, such as RAID-4, RAID-5, or RAID-DP, while the storage driver system 226 implements a storage access protocol such as Small Computer System Interface (SCSI) or FCP. The D-module 204 also includes a cluster interface module 228 to implement an intra-cluster communication link with S-modules and/or other D-modules.

The nodes in a cluster can cooperate, through their respective cluster interface modules, to provide a single file system namespace across all D-modules in the cluster. Thus, any S-module that receives a data request can access any data container within the single file system namespace located on any D-module of the cluster, and the location of that data container can remain transparent to the host and its user.

The cluster interface modules 216 and 228 implement a protocol to communicate commands and data among the modules of cluster. Such communication can be effected by a D-module 204 exposing an application programming interface (API), to which an S-module 202 (or another D-module) issues calls. To that end, a cluster interface module can be organized as an encoder/decoder. The encoder of, for example, the cluster interface 216 on an S-module 202 can encapsulate a message as (i) a local procedure call (LPC) when communicating a file system command to a D-module 204 residing on the same node or (ii) a remote procedure call (RPC) when communicating the command to a D-module residing on a remote node of the cluster. In either case, the decoder of the cluster interface 228 on the D-module de-encapsulates the message and processes the included command.

The D-module 204 also includes a cluster transaction manager 230 and a cluster quorum manager 232. The cluster quorum manager 232 monitors the nodes that are currently members of the cluster and maintains a list of the active and available nodes in the cluster. The cluster transaction manager 230 provides the functionality to perform distributed operations as a single transaction that will either succeed or fail across all cluster nodes affected by the transaction. The cluster transaction manager 230 relies on the cluster quorum manager 232 to identify nodes that are active and available in the cluster. While the cluster transaction manager 230 and the cluster quorum manager 232 are shown as components of the D-module 204 in this description, they can be located logically at essentially any place in the operating system. For example, the operating system can include a common module, shared between the S-module 202 and D-module 204, in which the cluster quorum manager 232 and cluster transaction manager 230 can be located.

The storage operating system includes management components which provide a path for a storage administrator to request storage management operations on the SAN-attached clustered storage system. These management components are not germane to this disclosure, and thus are not described in detail. However, the management operations requested by a storage administrator are passed from the management module to the S-module 202 and/or D-module 204 where they are processed. The management components along with underlying processing hardware form the management module 206.

The architecture of the SCSI target 212, in one embodiment, is based on the SCSI Architecture Model defined by T10, the SCSI standard providing body. As briefly described above, the SCSI targets implement one or more target sub-devices and presents a single system view of the target sub-devices to the host (SCSI initiator) 106. However, because of the distributed cluster model, each node 102 internally implements a SCSI target instance 212 that cooperates with each of the other SCSI target instances in the cluster to provide a consistent and scalable cluster. The distributed SCSI target instances 212 rely on infrastructure provided by the cluster (e.g., cluster transaction manager 230) to consistently implement SCSI semantics in each cluster node 102.

Figure 3:
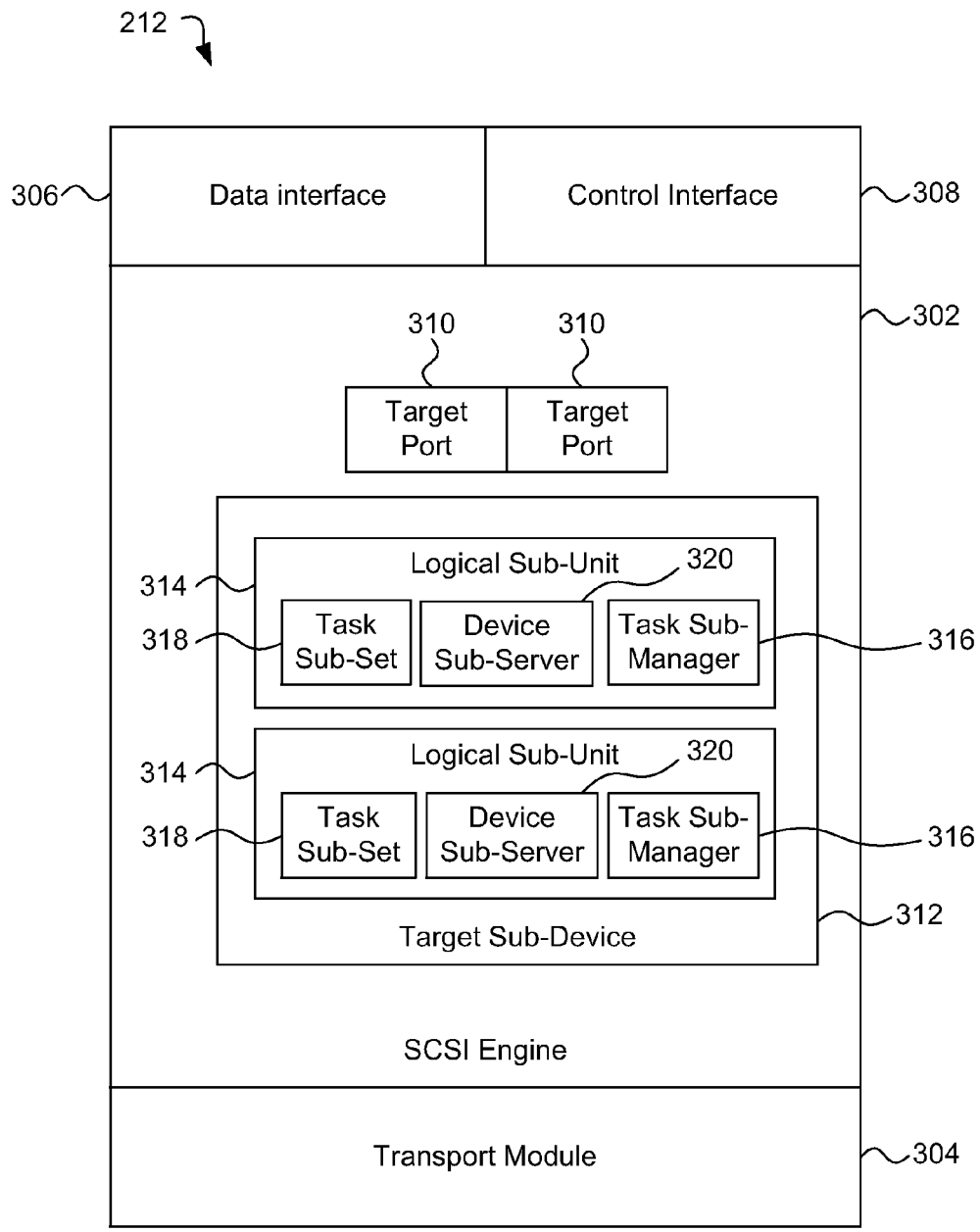
FIG. 3 shows an example block diagram of the components of a SCSI target in an S-module of a cluster node.

FIG. 3 is a block diagram of the components of a SCSI target 212 in the S-module 202 of a cluster node 102 according to one embodiment. The SCSI target 212 includes a SCSI engine 302, a transport module 304, a data interface 306, and a control interface 308. The SCSI engine can instantiate one or more logical target ports 310, one or more target sub-devices 312 including logical sub-units 314, and one or more device sub-servers 320. The elements of the SCSI target 212 can be implemented by programmable circuitry programmed or configured by software and/or firmware, or it can be implemented entirely by special-purpose "hardwired" circuitry, or in a combination of such forms.

The SCSI engine 302 is the core functional block of a SCSI target instance 212 and implements, among other things, SCSI objects such as the target ports 310, the SCSI target sub-device(s) 312, and logical sub-unit(s) 314. The SCSI engine 302 performs SCSI protocol processing functions such as, for example, parsing/validating command descriptor blocks and parameter data, implementing a generic SCSI task state machine, defining SCSI objects, formatting response data, and selecting response and error codes based on host profiles.

As described above, a target device is a distributed object that includes a set of target sub-devices 312 hosted on one or more nodes 102 in the cluster. The target device is a representation of a storage server that stores and serves data to one or more host systems. In one embodiment, the target device corresponds to a virtual server, where there can be multiple virtual servers that share a single set of physical resources. The target device is distributed as the set of target sub-devices 312 such that a host accessing the system on any given node sees a consistent view of the target device. The target sub-devices 312 on each node 102 coordinate operations using the cluster transaction manager 230, for example, to maintain consistent context information. This process is described in more detail below with reference to FIG. 4.

Each target sub-device 312 is multi-protocol capable (i.e., supports FCP, iSCSI or any other SCSI transport protocol). To that end, each target sub-device 312 is identified to the host 106 based on multiple protocols. For example, for a host accessing the cluster based on Fibre Channel Protocol (FCP) the target sub-device 312 is identified by a World-Wide Node Name (WWNN), whereas for a host accessing the cluster based on iSCSI the target sub-device 312 is identified by an iSCSI Target Node Name (e.g., an iSCSI Qualified Name (IQN)). In one embodiment, the target sub-device 312 is also identified by a protocol agnostic identifier.

Each target sub-device 312 is associated with a set of logical target ports 310 and contains one or more logical sub-units 314. In one embodiment, similar to the SCSI target 212 and the target sub-device 312, one or more nodes 102 of the cluster can each host a logical sub-unit 314, where the logical sub-units collectively make up a logical unit. The logical sub-units 314 share global context information (e.g., state and configuration information) associated with the logical unit. The logical sub-units 314 are each associated with a task sub-manager 316 that coordinates state and configuration changes by using the cluster transaction manager 230 to distribute changes, requested at one logical sub-unit 314, to the remaining logical sub-units that make up the distributed logical unit. The distributed logical unit is a representation of physical storage, or an abstraction of physical storage such as a volume, on which data in the cluster is stored. A collection of logical sub-units distributed across multiple cluster nodes can be identified to a host 106 by the same globally unique logical unit identifier for purposes of access by the host 106.

SCSI initiators, e.g., host 106, access logical sub-units via logical target ports 310. In one embodiment, multiple logical target ports 310 can reference a single physical port on the same node. Logical target ports 310 are associated with a physical port when the transport module 304, in response to a command from the management module 206, associates the identifier for the logical target port (i.e., transport protocol dependent and transport protocol independent identifiers) with a physical port on the node. The transport module 304 registers the logical target port information with the SCSI target 212 which then instantiates the logical target port 310. The transport module 304 can then advertise the logical port 310 in the SAN 110 (e.g., via Fibre Channel Fabric Login or during iSCSI discovery) which enables the host 106 to discover and connect to the logical port 310.

The primary function of the logical target ports 310 is to provide routing for commands and/or task management functions from the host 106 to the appropriate logical sub-unit 314. To this end, logical target ports 310 provide a point of access for the target sub-device 312. Each target sub-device 312 is associated with a separate set of logical target ports 310. Each logical target port 310 of the set is identified by a transport protocol dependent identifier (e.g., WWPN or IQN+TPG Tag) and a transport protocol independent relative target port identifier (RTP Id). The logical target ports 310 are used by the SCSI engine 302 to interface with FCP and iSCSI transport modules using the transport module 304. In one embodiment, the transport interface 304 is implemented as an API.

Data interface 306 is used by the SCSI engine 302 to send read/write operations to the storage manager 222 in the D-module 204 that hosts the physical storage where the read/write operation is to take place. Data interface 306 maps the operations requested by the SCSI engine 302 to the format used by the cluster interface 216 and notifies the cluster interface of the operation destination (i.e., the specific D-module that hosts the physical storage). The data interface 306 also receives and interprets completion/error messages from the D-module 204. The data interface 306 can then forward the completion/error messages to the SCSI engine 302 to determine the next steps for the read/write operation.

The control interface 308 is used by the SCSI engine 302 to synchronize execution of SCSI semantics with corresponding SCSI engines in other cluster nodes 102. As briefly described above, each logical sub-unit 314 is associated a task sub-manager 316 to sequence and process commands and task management requests. An example of a task management request is LOGICAL UNIT RESET, which resets a logical unit to its initial power on state (i.e., discards all state information and disposes all queued commands without executing them). A task management request is received at one logical sub-unit but may need to be processed by all logical sub-units that collectively make up the single distributed logical unit. The device sub-server 320 coordinates processing of commands and task management functions the need to be processed by each of the logical sub-units, such that the context information remains consistent between the logical sub-units.

The control interface 308 allows the task sub-manager 316 to communicate over the cluster interface 216 with the cluster transaction manager 230. Specifically, the control interface 308 maps requests for distributed operations from the SCSI engine 302 into transactions distributed to other instances of the distributed logical unit by the cluster transaction manager 230. The task sub-manager 316 uses the control interface 308 to synchronize a set of tasks in the task sub-set 318 that affect the context information maintained by the logical sub-unit 314. This enables each task sub-manager 316 associated with a logical unit to have a representation of a single global task set. The process of maintaining consistent context information is described in more detail below with reference to FIG. 5.

Figure 4:
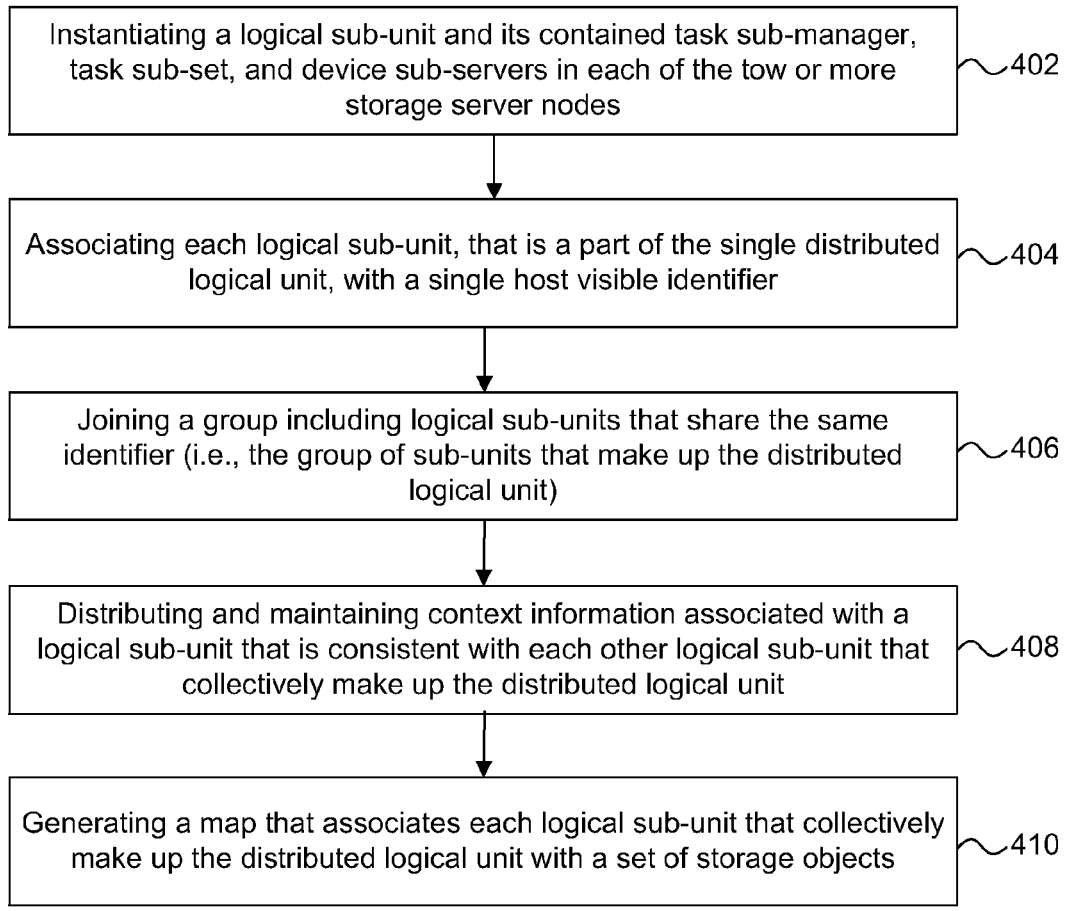
FIG. 4 is a flow diagram of a process for implementing a distributed logical unit in a clustered storage system in a SAN environment.
Figure 5:
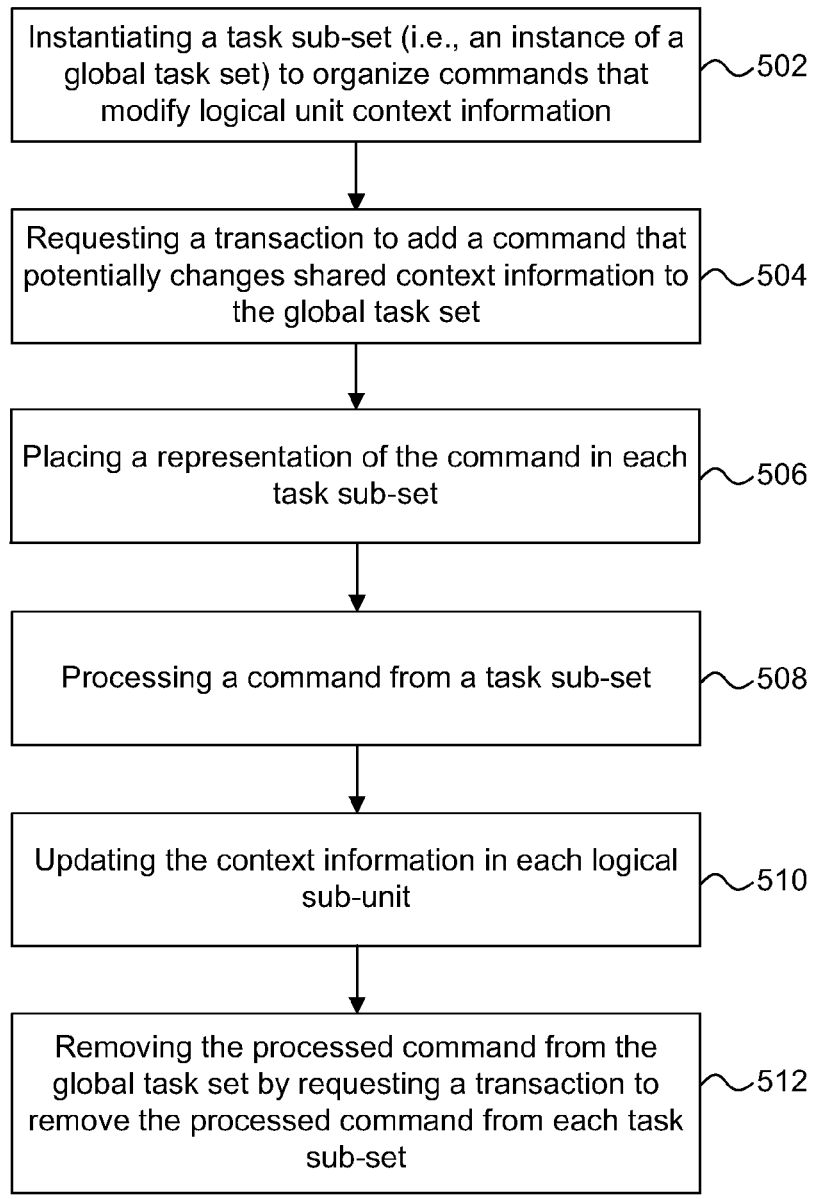
FIG. 5 is a flow diagram of a process for maintaining consistent context information between logical sub-units of a distributed logical unit.

FIG. 4 is a flow diagram of a process for implementing a distributed logical unit in a SAN-attached clustered storage system. The processes described in FIGS. 4 and 5 are organized as sequences of operations in the flowcharts. However, it should be understood that at least some of the operations associated with these processes potentially can be reordered, supplemented, or substituted for, while still performing the same overall technique.

As described above, the cluster presents a single system view of a distributed logical unit to the host, such that access to a particular logical sub-unit of the distributed logical unit is transparent to the host. In other words, the host is not aware of the existence of the logical sub-units and it appears to the host that the host is accessing a singular logical unit rather than a distributed logical unit. In one embodiment, at step 402, the S-module 202 of each cluster node 102 instantiates a logical sub-unit 314 associated with a target sub-device 312. The logical unit 314 includes the task sub-manager 316, the task sub-set 318, and device sub-server 320. In one embodiment, the S-module on only a subset of the cluster nodes instantiates a logical-sub unit such that there may be some nodes in the cluster that do not include a target sub-device or a logical sub-unit associated with that target sub-device.

At step 404, the SCSI target 212 of the S-module 202 associates each logical sub-unit, that is part of the single distributed logical unit, with a single host visible identifier. Thus, each logical sub-unit is identified with a single identifier such that the logical sub-units are not visible to the host a separate entities from the single distributed logical unit.

At step 406, each logical sub-unit joins a group that includes logical sub-units that share the same host visible identifier. As described above, a cluster transaction manager 230 coordinates communication across the cluster. The cluster transaction manager 230 enables each logical sub-unit having the same host visible identifier to join a common group and communicate with each other logical sub-unit in the group by coordinating the distribution of proposals to each member of the group.

At step 408, the S-module distributes and maintains context information for each logical sub-unit 314 that is consistent with corresponding context information of each other logical sub unit such that the logical sub-units collectively make up a single distributed logical unit. The process for maintaining the context information is described in more detail below with reference to FIG. 5. At step 410, the S-module 202 in each node that includes a logical sub-unit generates a map that associates each logical sub-unit 314 that collectively make up the distributed logical unit with a set of storage objects that are associated with the distributed logical unit. In one embodiment, the map is a database that associates a LUN, or some other storage object identifier, with each logical sub-unit.

As described above, in order to maintain a consistent view of a distributed logical unit across all of the nodes in a cluster, SCSI target 212 maintains context information for each logical sub-unit that is consistent with the corresponding context information for each of the other logical sub-units. SCSI target 212 can maintain the context information in a data structure in memory, for example. Such context information can include, for example, a data access state (e.g., connected/not-connected), an administrative state (e.g., enabled/disabled), a SCSI reservation state and/or type, a power condition state (e.g., active, idle, standby, stopped, etc.), logical unit configuration (e.g., a logical unit identifier such as a LUN Serial Number, block size, geometry, Asymmetric Logical Unit Access ("ALUA")/non-ALUA personality, etc.), and/or logical unit metadata such as mode pages that advertise a specific logical unit behavior to the host and log pages that export various statistics associated with the logical unit to the host. The context information can be modified as a result of processing commands, for example, SCSI commands or calls made to APIs exposed by the SCSI target 212. Execution of these commands can is synchronized on each node of the cluster using the cluster transaction manager 230 as described in more detail below.

FIG. 5 is a flow diagram of a process for maintaining consistent context information between logical sub-units of a distributed logical unit. At step 502, the task sub-manager 316 of each logical sub-unit 314 instantiates an instance of a global task set (i.e., task sub-set 318), to organize any commands that will modify the context information. In order to maintain the consistency of the context information, commands that modify the context information are performed in the order that they appear in the global task set. The consistency of each task sub-set 318 is maintained by using the cluster transaction manager 230 to coordinate when, and in what order, a command can be placed in the global task set.

For each command in the global task set, the task sub-manager 316 that proposed the transaction to place the command in the global task set can be considered the master task sub-manager. The master task sub-manager is responsible for requesting that the command be placed in the task set and, when the command has reached the top of the queue and is processed, notifying the other task sub-managers that the command has been processed.

At 504, the master transaction sub-manager requests a transaction by calling a proposal API exposed by the cluster transaction manager 230. The cluster transaction manager 230 forwards the request to the Group Coordinator (GC), which serializes transaction requests such that a consistent task sub-set 318 is maintained by each task sub-manager. If there are no other transaction requests processing, the GC forwards the request to each of the Group Members (GMs) associated with each of the task sub-managers and informs the task sub-managers to add the request to the corresponding task sub-set 318. Then, at step 506, each task sub-manager adds the command to the task sub-set in the order in which they are received by the GC, such that each instance of the global task set remains consistent.

At step 508, when the command requested by the master task sub-manager reaches the top of the queue, the master task sub-manager initiates processing of the command. When the command has been processed, at step 510, the master task sub-manager initiates a transaction using the cluster transaction manager 230 to update the context information maintained for each logical sub-unit. In response to receiving a confirmation from each SCSI target 212 that the context information has been updated, at step 512, the master task sub-manager removes the command from the task sub-set and requests a transaction to remove the processed command from each other task sub-set in the cluster so that the next command can be processed.

Figure 6:
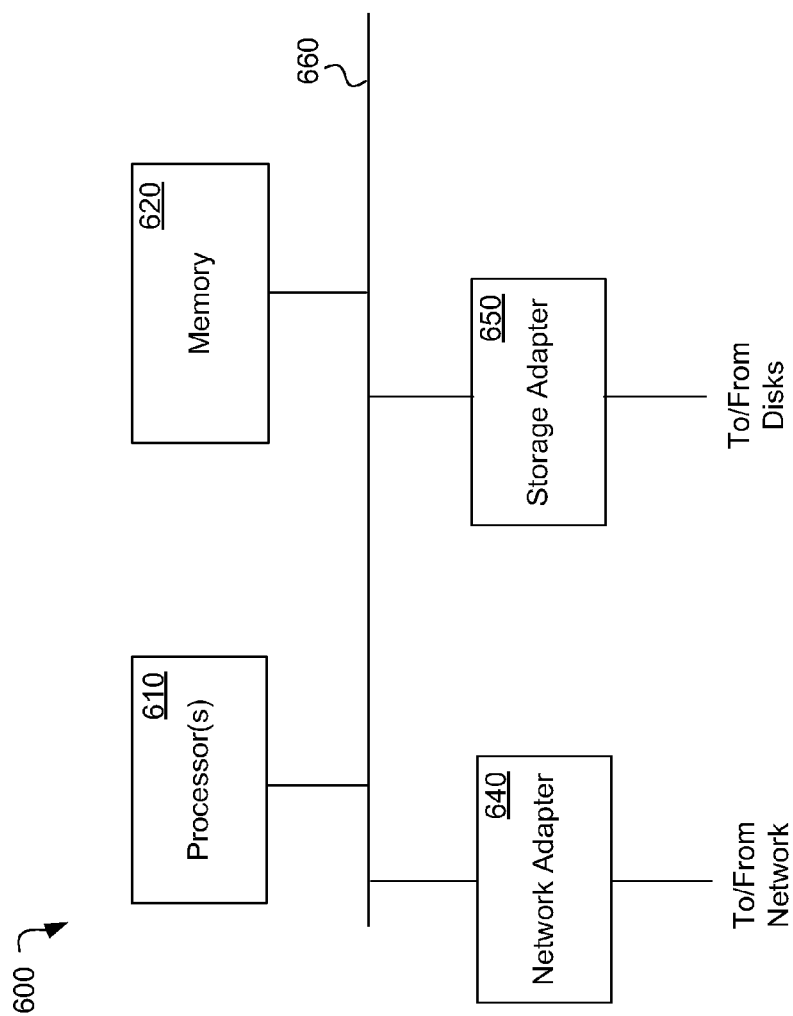
FIG. 6 is a block diagram of a system that can be used to implement one or more nodes of a clustered storage system in a SAN environment.

FIG. 6 is a block diagram of a system that can be used to implement components of a clustered storage area network. For example, the system of FIG. 6 can be used to implement a node (i.e., an S-module, a D-module, and/or a management module).

In an illustrative embodiment, the system 600 includes a processor subsystem 610 that includes one or more processors. The system 600 further includes memory 620, a network adapter 640, and a storage adapter 650, all interconnected by an interconnect 660.

The memory 620 illustratively comprises storage locations that are addressable by the processor(s) 610 and adapters 640 and 650 for storing software program code and data associated with the techniques introduced here. The processor 610 and adapters 640 and 650 may, in turn, comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 640 includes a plurality of physical ports, such as a Fibre Channel or Ethernet port, to couple the system 600 with one or more other systems over point-to-point links, wide area networks, virtual private networks implemented over a public network (Internet) or a shared local area network. The network adapter 640 thus can include the mechanical components and electrical circuitry that allows the system 600 to connect with the cluster interconnect and/or host. One or more systems can communicate with other systems over the by exchanging messages, for example, using packets or frames of data according to pre-defined protocols.

The storage adapter 650 cooperates with the operating system to access information on attached storage devices. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. The storage adapter 650 includes a plurality of ports having input/output (I/O) interface circuitry that couples with the disks over an I/O interconnect arrangement, such as a conventional high-performance, Fibre Channel (FC) link topology.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   in a SAN-attached clustered storage system that has a plurality of storage server nodes, implementing in each of two or more storage server nodes a logical sub-unit;
   maintaining, for each said logical sub-unit of the two or more storage server nodes, context information that is consistent with corresponding context information of each other logical sub-unit such that the logical sub-units collectively make up a single distributed logical unit, wherein the maintaining includes communicating, from a first storage server node corresponding to a first logical sub-unit to a second server node corresponding to a second logical sub-unit, an update to a portion of the context information; and
   associating each logical sub-unit with a single host-visible identifier of the single distributed logical unit so that the host can access a logical sub-unit of the single distributed logical unit, such that the logical sub-units are not visible to the host as entities separate from the single distributed logical unit;
   wherein maintaining context information that is consistent with the corresponding context information of each other logical sub-unit includes:
   implementing a separate instance of a global task set for each logical sub-unit of the single distributed logical unit, to queue commands and task management functions that modify the context information;
   coordinating entry of commands into each instance of the global task set such that all instances of the global task set are consistent with each other;
   processing a command from a first instance of the global task set; and
   updating the context information for each logical sub-unit to reflect the processing of the command.

2. The method of claim 1 further comprising, generating a map that associates each logical sub-unit that collectively make up the single distributed logical unit with a set of storage objects.

3. The method of claim 1, wherein the context information includes at least one of logical unit state information, logical unit configuration information, or logical unit metadata.

4. The method of claim 1, wherein the context information for each logical sub-unit includes information to indicate whether the single distributed logical unit supports ALUA or not.

5. The method of claim 1 further comprising, detecting corruption of context information associated with a corrupted logical sub-unit and quarantining the corrupted logical sub-unit by suspending communication with the corrupted logical sub-unit until the corrupted logical sub-unit recovers from the corruption.

6. The method of claim 1 further comprising:
   implementing a plurality of virtual target ports, wherein each of the plurality of virtual target ports is associated with a single physical target port of a storage server node; and
   presenting the plurality of virtual target ports to the host.

7. The method of claim 6, wherein each target device of a plurality of target devices implemented in the SAN-attached clustered storage system is associated with one or more of the plurality of virtual target ports.

8. A SAN-attached clustered storage system comprising:
   a plurality of storage server nodes coupled to communicate with each other through an interconnect, each storage server node of the plurality of storage server nodes including:
   a management module to enable management operations to be performed on the storage server node;
   a data module to provide data storage services for the storage server node; and
   a protocol module to allow a host to access the SAN-attached clustered storage system, the protocol module configured to implement a logical sub-unit of a single distributed logical unit and to associate the logical sub-unit with an identifier of the single distributed logical unit so that the host can perform a block-level access to the logical sub-unit of the single distributed logical unit, such that the logical sub-unit is not visible to the host as a separate entity from the single distributed logical unit, wherein the single distributed logical unit is divided into a number of fixed size logical blocks and wherein the block-level access enables the host to access at a granularity of a logical block;

wherein the protocol module of each storage server node is further configured to maintain context information that is consistent with corresponding context information of each other logical sub-unit in the SAN-attached clustered storage system; and wherein to maintain the context information that is consistent with the each other logical sub-unit in the SAN-attached clustered storage system, the protocol module of the each storage server node is configured to:

implement an instance of a global task set, to queue commands that modify the context information;

coordinate entry of commands into the global task set such that each instance of the global task set is consistent with each other instance of the global task set;

process a command from the instance of the global task set; and update the context information for the logical sub-unit to reflect the processing of the command.

9. The SAN-attached clustered storage system of claim 8, wherein the protocol module is further configured to generate a map that associates each logical sub-unit that collectively make up the single distributed logical unit with a set of storage objects.

10. The SAN-attached clustered storage system of claim 8, wherein the context information includes at least one of logical unit state information, logical unit configuration information, or logical unit metadata.

11. The SAN-attached clustered storage system of claim 8, wherein the protocol module is further configured to detect corruption of context information associated with a corrupted logical sub-unit and quarantine the corrupted logical sub-unit by suspending communication with the corrupted logical sub-unit until the corrupted logical sub-unit recovers from the corruption.

12. The SAN-attached clustered storage system of claim 8, wherein the protocol module of each storage server node is further configured to:

implement a plurality of virtual SCSI target ports, wherein each of the plurality of virtual SCSI target ports is associated with a physical target port of a corresponding storage server node; and present the plurality of virtual SCSI target ports to the host.

13. The SAN-attached clustered storage system of claim 8, wherein each storage server node of the plurality of storage server nodes further includes a plurality of virtual storage servers configured to operate in a SAN mode.

14. The SAN-attached clustered storage system of claim 12, wherein each the plurality of virtual SCSI target ports is associated with a virtual server of the plurality of virtual storage servers.

15. A method comprising:

in a SAN-attached clustered storage system that includes a plurality of storage server nodes, wherein each of two or more storage server nodes includes a logical sub-unit;

maintaining, for each said logical sub-unit of the two or more storage server nodes, context information that is consistent with corresponding context information of each of other logical sub-units such that the logical sub-units collectively make up a single distributed logical unit;

wherein, the maintaining includes:

implementing a separate instance of a global task set for each logical sub-unit of the single distributed logical unit, to queue commands that modify the context information;

coordinating entry of commands into each global task set such that all instances of the global task set are consistent with each other;

processing a command from a first instance of the global task set;

updating the context information for each logical sub-unit to reflect the processing of the command; and associating each logical sub-unit with a single host-visible identifier of the single distributed logical unit so that the host can access a logical sub-unit of the single distributed logical unit, such that the logical sub-units are not visible to the host as separate entities from the single distributed logical unit.

16. The method of claim 15, further comprising:

associating the single distributed logical unit with a target device;

creating a plurality of virtual target ports associated with the target device, wherein each of the two or more storage server nodes includes a virtual target port; and presenting, on each of the two or more storage server nodes, the plurality of virtual target ports to the host.

17. The method of claim 15 further comprising, generating a map associating a set of storage objects with each logical sub-unit of the distributed logical unit.

18. The method of claim 15, wherein the context information includes at least one of logical unit state information, logical unit configuration information, or logical unit metadata.

19. The method of claim 15 further comprising, detecting corruption of context information associated with an affected logical sub-unit and quarantining the affected logical sub-unit by suspending communication with the affected logical sub-unit until the affected logical sub-unit recovers from the corruption of context information.

* * * * *

UNITED STATES PATENT AND TRADEMARK OFFICE
CERTIFICATE OF CORRECTION

PATENT NO. : 8,683,170 B1  
APPLICATION NO. : 13/244159  
DATED : March 25, 2014  
INVENTOR(S) : Pranab Patnaik et al.

Page 1 of 1

It is certified that error appears in the above-identified patent and that said Letters Patent is hereby corrected as shown below:

In the Claims:

In column 11, line 52, In Claim 14, delete "each the" and insert -- each of the --, therefor.

Signed and Sealed this  
Eighth Day of July, 2014

Michelle K. Lee  
*Deputy Director of the United States Patent and Trademark Office*